US010309782B2

(12) United States Patent
Kapusta et al.

(10) Patent No.: US 10,309,782 B2
(45) Date of Patent: Jun. 4, 2019

(54) QUALITY FACTOR ESTIMATION FOR RESONATORS

(71) Applicant: Analog Devices, Inc., Norwood, MA (US)

(72) Inventors: Ronald A. Kapusta, Bedrod, MA (US); Jiefeng Yan, Billerica, MA (US); James Lin, Malden, MA (US)

(73) Assignee: Analog Devices, Inc., Norwood, MA (US)

( * ) Notice: Subject to any disclaimer, the term of this patent is extended or adjusted under 35 U.S.C. 154(b) by 507 days.

(21) Appl. No.: 15/092,943

(22) Filed: Apr. 7, 2016

(65) Prior Publication Data

US 2016/0298963 A1    Oct. 13, 2016

Related U.S. Application Data

(60) Provisional application No. 62/144,126, filed on Apr. 7, 2015.

(51) Int. Cl.
*G01C 19/5776*    (2012.01)
*G01C 19/56*    (2012.01)

(52) U.S. Cl.
CPC ................. *G01C 19/5776* (2013.01)

(58) Field of Classification Search
CPC ............ G01C 19/5776; G01C 19/5712; G01C 19/56; G01C 19/5719; G01C 19/5755; G01C 19/5762; G01C 19/574
See application file for complete search history.

(56) References Cited

U.S. PATENT DOCUMENTS

| 5,218,867 A | 6/1993 | Varnham et al. ............... 73/505 |
| 5,540,094 A | 7/1996 | Varnham et al. .......... 73/504.13 |
| 5,866,816 A * | 2/1999 | Hulsing, II ........ G01C 19/5607 73/504.16 |
| 5,889,193 A | 3/1999 | Pfaff et al. .................... 73/1.37 |

(Continued)

FOREIGN PATENT DOCUMENTS

| CN | 102620726 A | 8/2012 | ............ G01C 19/56 |
| CN | 107449414 A | 12/2017 | |

(Continued)

OTHER PUBLICATIONS

Ayazi et al., "Design and Fabrication of a High-Performance Polysilicon Vibrating Ring Gyroscope", Center for Integrated Sensors and Circuits, Eleventh IEEE/ASME International Workshop on Micro Electro Mechanical Systems, Heidelberg, Germany, pp. 621-626, Jan. 25-29, 1998.

(Continued)

*Primary Examiner* — Helen C Kwok
(74) *Attorney, Agent, or Firm* — Wolf, Greenfield & Sacks, P.C.

(57) ABSTRACT

Various embodiments provide methods of determining the quality factor of a resonating body in ways that are advantageous over previously known methods. For example, embodiments allow the determination of the quality factors of a resonating body without preventing the simultaneous use of the resonating body. For micromachined ("MEMS") devices, embodiments allow the determination of the quality factors of a resonating body in a manner that is not dependent on transduction parameters of the MEMS device.

20 Claims, 8 Drawing Sheets

(56) References Cited

U.S. PATENT DOCUMENTS

| | | | |
|---|---|---|---|
| 5,969,225 A * | 10/1999 | Kobayashi | G01C 19/5719 73/1.37 |
| 5,987,984 A | 11/1999 | Artzner et al. | 73/497 |
| 5,992,233 A | 11/1999 | Clark | |
| 6,018,996 A * | 2/2000 | Matsuhiro | G01C 19/5649 73/504.12 |
| 6,198,355 B1 | 3/2001 | Lindquist et al. | |
| 6,510,737 B1 | 1/2003 | Hobbs | 73/504.12 |
| 6,598,455 B1 | 7/2003 | Gutierrez et al. | 73/1.77 |
| 6,768,358 B2 | 7/2004 | Birk et al. | |
| 6,934,665 B2 | 8/2005 | Rober | 702/189 |
| 7,123,111 B2 | 10/2006 | Brunson et al. | |
| 7,188,522 B2 | 3/2007 | Betz et al. | 73/504.12 |
| 7,219,529 B2 | 5/2007 | Fell et al. | 73/1.77 |
| 7,253,615 B2 | 8/2007 | Berkcan et al. | 324/244 |
| 7,640,803 B1 | 1/2010 | Gutierrez et al. | 73/504.04 |
| 7,980,133 B2 | 7/2011 | Geen et al. | 73/504.04 |
| 8,151,641 B2 | 4/2012 | Geen | 73/504.12 |
| 8,347,718 B2 | 1/2013 | Malvern et al. | 73/504.13 |
| 8,375,789 B2 | 2/2013 | Prandi et al. | |
| 8,401,140 B2 | 3/2013 | Mijuskovic | |
| 8,446,222 B2 | 5/2013 | Brenndorfer | |
| 8,464,571 B1 * | 6/2013 | Sparks | G01P 21/00 702/104 |
| 8,497,746 B2 | 7/2013 | Visconti et al. | |
| 8,616,055 B2 | 12/2013 | Geen | 73/504.12 |
| 8,624,679 B2 | 1/2014 | Dikshit et al. | |
| 8,661,898 B2 | 3/2014 | Watson | |
| 8,689,631 B1 * | 4/2014 | Tally | G01C 19/5762 73/504.12 |
| 8,701,459 B2 | 4/2014 | Geen | 73/1.38 |
| 8,884,710 B2 | 11/2014 | Shaeffer et al. | |
| 9,103,845 B2 | 8/2015 | Schlarmann et al. | |
| 9,176,165 B2 * | 11/2015 | Quer | G01L 9/0008 |
| 9,278,847 B2 | 3/2016 | Cazzaniga et al. | |
| 9,410,806 B2 | 8/2016 | Ezekwe | |
| 9,459,100 B2 | 10/2016 | Balachandran et al. | |
| 9,506,757 B2 | 11/2016 | Shaeffer et al. | |
| 9,634,678 B1 | 4/2017 | Caffee et al. | |
| 9,709,400 B2 | 7/2017 | Kapusta | |
| 2001/0029784 A1 * | 10/2001 | Kurachi | G01C 19/5719 73/504.02 |
| 2003/0101814 A1 | 6/2003 | Challoner et al. | 73/504.12 |
| 2005/0183502 A1 * | 8/2005 | Rodney | E21B 47/022 73/504.02 |
| 2005/0257596 A1 | 11/2005 | Fell et al. | 73/1.37 |
| 2006/0142958 A1 * | 6/2006 | Morell | G01C 19/56 702/56 |
| 2006/0201250 A1 | 9/2006 | Kourepenis et al. | 73/504.16 |
| 2007/0119258 A1 | 5/2007 | Yee | 73/649 |
| 2007/0163345 A1 * | 7/2007 | Nozoe | G01C 19/5607 73/504.16 |
| 2007/0256495 A1 * | 11/2007 | Watson | G01C 19/56 73/504.12 |
| 2008/0170742 A1 * | 7/2008 | Trusov | G01C 19/5719 381/396 |
| 2009/0083011 A1 * | 3/2009 | Hao | G06F 17/5009 703/2 |
| 2009/0249875 A1 | 10/2009 | Steinlechner | 73/504.12 |
| 2009/0272189 A1 * | 11/2009 | Acar | G01C 19/574 73/504.16 |
| 2009/0282916 A1 | 11/2009 | Modugno et al. | 73/504.12 |
| 2010/0212424 A1 | 8/2010 | Malvern et al. | 73/504.13 |
| 2010/0271067 A1 | 10/2010 | Cauli et al. | |
| 2011/0167891 A1 | 7/2011 | Geen | 73/1.38 |
| 2012/0006114 A1 | 1/2012 | Caminada et al. | 73/504.12 |
| 2012/0024057 A1 * | 2/2012 | Sasaki | G01C 19/5614 73/504.12 |
| 2013/0098153 A1 | 4/2013 | Trusov et al. | 73/504.16 |
| 2013/0283908 A1 * | 10/2013 | Geen | G01C 19/5719 73/504.12 |
| 2014/0000365 A1 | 1/2014 | Aaltonen et al. | |
| 2014/0000366 A1 | 1/2014 | Blomqvist | 73/504.12 |
| 2014/0085017 A1 * | 3/2014 | Tsinker | H03B 5/30 331/135 |
| 2015/0226557 A1 | 8/2015 | Aaltonen | |
| 2015/0247877 A1 * | 9/2015 | Kanemoto | G01P 1/04 73/504.04 |
| 2015/0285658 A1 | 10/2015 | Zotov et al. | |
| 2015/0341041 A1 | 11/2015 | Balachandran et al. | |
| 2016/0298965 A1 | 10/2016 | Kapusta | |
| 2016/0334213 A1 | 11/2016 | Dewall | |
| 2017/0135600 A1 | 5/2017 | Chien et al. | |
| 2017/0214407 A1 | 7/2017 | Kianush et al. | |
| 2017/0307374 A1 * | 10/2017 | Hughes | G01C 19/5776 |

FOREIGN PATENT DOCUMENTS

| | | | |
|---|---|---|---|
| EP | 2211458 A1 | 7/2010 | |
| EP | 2 657 648 A2 | 10/2013 | G01C 19/5719 |
| JP | 2013-521486 | 6/2013 | |
| WO | WO 01/79862 A1 | 10/2001 | G01P 9/04 |

OTHER PUBLICATIONS

Ayazi et al., "High Aspect-Ratio Combined Poly and Single-Crystal Silicon (HARPSS) MEMS Technology;" Journal of Microelectromechanical Systems, vol. 9, No. 3, p. 288-294, IEEE, Sep. 2000.

Ayazi et al., "A HARPSS Polysilicon Vibrating Ring Gyroscope", Journal of Microelectromechanical Systems, vol. 10, No. 2, pp. 169-179, IEEE, Jun. 2001.

Fan et al., "An Adaptive Feedback Circuit for MEMS Resonators", Journal of Micromechanics and Microengineering, IOP Publishing, vol. 21, 11 pages, Mar. 1, 2011.

Geen et al., "New iMEMS® Angular-Rate-Sensing Gyroscope", ADI Micromachined Products Division; Analog Dialogue 37-4, , 4 pages , 2003.

Leland, "Adaptive Mode Tuning for Vibrational Syroscopes", IEEE Transaction on Control System Technology, vol. 11, No. 2, pp. 242-247, IEEE, Mar. 2003.

Mathias et al., "Architecture for Integrated MEMS Resonators Quality Factor Measurement", DTIP of MEMS & MOEMS Conf., Stresa, Italy, EDA Publishing, 5 pages Apr. 25-27, 2007.

Nguyen, "Micromechanical Resonators for Oscillators and Filters", IEEE Ultrasonics Symposium, vol. 1, IEEE, pp. 489-499, Nov. 1995.

Oboe et al., "Control of a Z-Axis MEMS Vibrational Gyroscope", IEEE/ASME Transactions on Mechatronics, vol. 10, No. 4, IEEE, pp. 364-370, Aug. 2005.

Ozdemir et al., "Measuring the Quality Factor in MEMS Devices", Micromachines, vol. 6, MDPI, pp. 1935-1945, Dec. 8, 2015.

Park et al., "Laterally Oscillated and Force-Balanced Micro Vibratory Rate Gyroscope Supported by Fish Hook Shape Springs", Proceedings of the IEEE 10th Annual International Workshop on Micro Electro Mechanical Systems, IEEE, pp. 494-499, Jan. 1997.

Tang et al. "A Packaged Silicon MEMS Vibratory Gyroscope for Microspacecraft," Proceedings of the IEEE 10th Annual International Workshop on Micro Electro Mechanical Systems, IEEE, pp. 500-505, Jan. 1997.

Zeng et al., "An Energy-Efficient readout circuit for resonant sensors based on ring-down measurement (Review of Scientific Instruments", Review of Scientific Instruments, vol. 84, 2013 American Institute of Physics. 8 pages, Feb. 25, 2013.

Zhang et al. "High precision measurement of quality factor for MEMS Resonators", ScienceDirect, Procedia Chemistry, Vo. 1, Elsevier B.V., pp. 827-830, 2009.

International Searching Authority, International Search Report— International Application No. PCT/US2016/026385, dated Jul. 28, 2016, together with the Written Opinion of the International Searching Authority, 10 pages.

Great Britain Combined Search and Examination Report dated Oct. 12, 2016 in connection with Great Britain Application No. GB 1604932.2.

[No Author Listed], ADXRS290 Ultralow noise, dual-axis MEMS gyroscope for stabilization applications. Analog Devices Data Sheet.

(56) References Cited

OTHER PUBLICATIONS

Retrieved from the Internet (last accessed Apr. 20, 2018) http://www.analog.com/en/products/sensors-mems/gyroscopes/adxrs290.html#product-overview.
[No Author Listed], ADXC1500, Combined gyroscope and dual-axis accelerometer. Analog Devices Data Sheet. Retrieved from the Internet (last accessed Apr. 20, 2018) http://www.analog.com/en/products/sensors-mems/inertial-measurement-units/adxc1500.html.
International Preliminary Report on Patentability dated Oct. 19, 2017 in connection with International Application No. PCT/US2016/026385.
Aaltonen et al., An analog drive loop for a capacitive MEMS gyroscope. Analog Integr Circ Sig Process. 2010;63:465-76.
Balachandran et al., A 3-Axis Gyroscope for Electronic Stability Control With Continuous Self-Test. IEEE Journal of Solid-State Circuits. Jan. 2016;51(1):177-186.
Izyumin, Readout Circuits for Frequency-Modulated Gyroscopes. Electrical Engineering and Computer Sciences. University of California at Berkely. Technical Report No. UCB/EECS-2015-214. Dec. 1, 2015; 93 pages.
Kundert, Predicting the Phase Noise and Jitter of PLL-Based Frequency Synthesizers. The Designer's Guide Community Oct. 2015; Version 4i:pp. 1-52.

\* cited by examiner

FIG. 8    300

QUALITY FACTOR ESTIMATION FOR RESONATORS

CROSS-REFERENCE TO RELATED APPLICATION(S)

This patent application claims the benefit of U.S. Provisional Patent Application No. 62/144,126 entitled Quality Factor Estimation for Resonators filed on Apr. 7, 2015, which is hereby incorporated herein by reference in its entirety.

The subject matter of this patent application also may be related to U.S. patent application Ser. No. 14/680,776 entitled System, Apparatus, and Method for Resonator and Coriolis Axis Control in Vibratory Gyroscopes filed on Apr. 7, 2015, which is hereby incorporated herein by reference in its entirety.

TECHNICAL FIELD

The present invention relates to resonating structures, and more particularly to determining the quality factor of a resonating structure.

BACKGROUND ART

In MEMS-based resonators (e.g., MEMS gyroscopes and other types of sensors) and other types of resonators, the magnitude of motion of a resonating body is a function of the drive force applied to induce the resonant motion of the resonating body, but is also a function of other forces, and can be described by an equation of motion. Typically, the resonating body is driven at resonance, in which case the velocity magnitude is such that the applied drive force is balanced by a mechanical damping force. Quality factor is an inverse measure of loss in the system. There are many sources of mechanical damping, none of which are very stable. Most sources are strong functions of temperature (e.g., thermoelastic damping, squeeze-film damping, etc.), though the sources do not necessarily have the same temperature dependence. Squeeze-film damping is also a strong function of ambient pressure, so a gyroscope packaged in a vacuum will often change behavior as the pressure inside the package changes, perhaps due to outgassing. Because the damping forces (quality factor) will change significantly due to environmental stresses, the resonator velocity amplitude is not stable. This can lead to a variety of system performance issues that can vary over time as the device is in use.

It is known to find the quality factor of a resonator by driving the resonator to its resonant frequency, and then observing the decay of the resonator's amplitude after terminating the drive forces. The resonator's amplitude will decay exponentially, and the time constant of that exponential decay can be used to determine the resonator's quality factor. Alternately, a resonator's quality factor may be determined by driving the resonator at a variety of frequencies and plotting the resonator's amplitude at each such frequency.

SUMMARY OF THE EMBODIMENTS

In accordance with one embodiment, a method of measuring or estimating the quality factor of a resonator (e.g., an oscillating MEMS resonator) includes driving the resonator between alternating ramp-up and ring-down phases, the ramp-up phases driven using a first drive signal for a first duration, the ring-down phases driven using a second drive signal for a second duration, wherein the first drive signal has a first amplitude and where the second drive signal has a second amplitude less than the first amplitude; making first and second measurements of a parameter associated with resonance of the resonator; and producing an estimation of the quality factor of the resonator based on the first and second measurements.

In various alternative embodiments, the two measurements may be made during the same ramp-up or ring-down phase or during different ramp-up or ring-down phases. The second drive signal may be a zero amplitude drive signal. The parameter of the motion of the resonator may be the amplitude of the motion of the resonator, the velocity of the resonator, the displacement of the resonator, the current flow proportional to the velocity of the resonator, or the charge proportional to the displacement of the resonator. The resonator may be part of a sensor having a sensor bandwidth, in which case driving the resonator between alternating ramp-up and ring-down phases may involve alternatingly switching between the first drive signal and the second drive signal at a frequency above the sensor bandwidth. The method may further include adjusting at least one of the first drive signal, the first duration, the second drive signal, or the second duration based on the estimation of the quality factor of the resonator.

In accordance with another embodiment, apparatus for estimating the quality factor of a resonator comprises a driver circuit and a quality factor measurement circuit. The driver circuit is configured to drive the resonator between alternating ramp-up and ring-down phases, the ramp-up phases driven using a first drive signal for a first duration, the ring-down phases driven using a second drive signal for a second duration, wherein the first drive signal has a first amplitude and where the second drive signal has a second amplitude less than the first amplitude. The quality factor measurement circuit is configured to make first and second measurements of a parameter associated with resonance of the resonator, and is also configured to produce an estimation of the quality factor of the resonator based on the first and second measurements.

In various alternative embodiments, the two measurements may be made during the same ramp-up or ring-down phase or during different ramp-up or ring-down phases. The second drive signal may be a zero amplitude drive signal. The parameter of the motion of the resonator may be the amplitude of the motion of the resonator, the velocity of the resonator, the displacement of the resonator, the current flow proportional to the velocity of the resonator, or the charge proportional to the displacement of the resonator. The resonator may be part of a sensor having a sensor bandwidth, in which case driving the resonator between alternating ramp-up and ring-down phases may involve alternatingly switching between the first drive signal and the second drive signal at a frequency above the sensor bandwidth. The driver circuit may be further configured to adjust at least one of the first drive signal, the first duration, the second drive signal, or the second duration based on the estimation of the quality factor of the resonator produced by the quality factor measurement circuit. The apparatus may further include a sensor output circuit for processing sensed signals and driving the resonator between alternating ramp-up and ring-down phases may result in a corresponding high-frequency component in the sensed signals due to coupling from the motion of the resonator, in which case the sensor output circuit may include a filter (e.g., a low-pass filter or band-pass filter) for filtering out the high-frequency component.

In accordance with yet another embodiment, a MEMS gyroscope comprises a resonator, a driver circuit, a quality factor measurement circuit, and a gyroscope output circuit. The driver circuit is configured to drive the resonator between alternating ramp-up and ring-down phases, the ramp-up phases driven using a first drive signal for a first duration, the ring-down phases driven using a second drive signal for a second duration, wherein the first drive signal has a first amplitude and where the second drive signal has a second amplitude less than the first amplitude. The quality factor measurement circuit is configured to make first and second measurements of a parameter associated with resonance of the resonator, and is also configured to produce an estimation of the quality factor of the resonator based on the first and second measurements. The gyroscope output circuit is configured to sense rotation of the MEMS gyroscope based on Coriolis-induced signals.

In various alternative embodiments, the two measurements may be made during the same ramp-up or ring-down phase or during different ramp-up or ring-down phases. The second drive signal may be a zero amplitude drive signal. The parameter of the motion of the resonator may be the amplitude of the motion of the resonator, the velocity of the resonator, the displacement of the resonator, the current flow proportional to the velocity of the resonator, or the charge proportional to the displacement of the resonator. The MEMS gyroscope has a sensor bandwidth, and the driver circuit may be configured to alternatingly switch between the first drive signal and the second drive signal at a frequency above the sensor bandwidth. The driver circuit may be further configured to adjust at least one of the first drive signal, the first duration, the second drive signal, or the second duration based on the estimation of the quality factor of the resonator produced by the quality factor measurement circuit. Driving the resonator between alternating ramp-up and ring-down phases may result in a corresponding high-frequency component in the Coriolis-induced signals due to coupling from the motion of the resonator, in which case the gyroscope output circuit may include a filter (e.g., a low-pass filter or band-pass filter) for filtering out the high-frequency component. The gyroscope output circuit may be configured to demodulate the Coriolis-induced signals with the drive signal used to drive the resonator.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
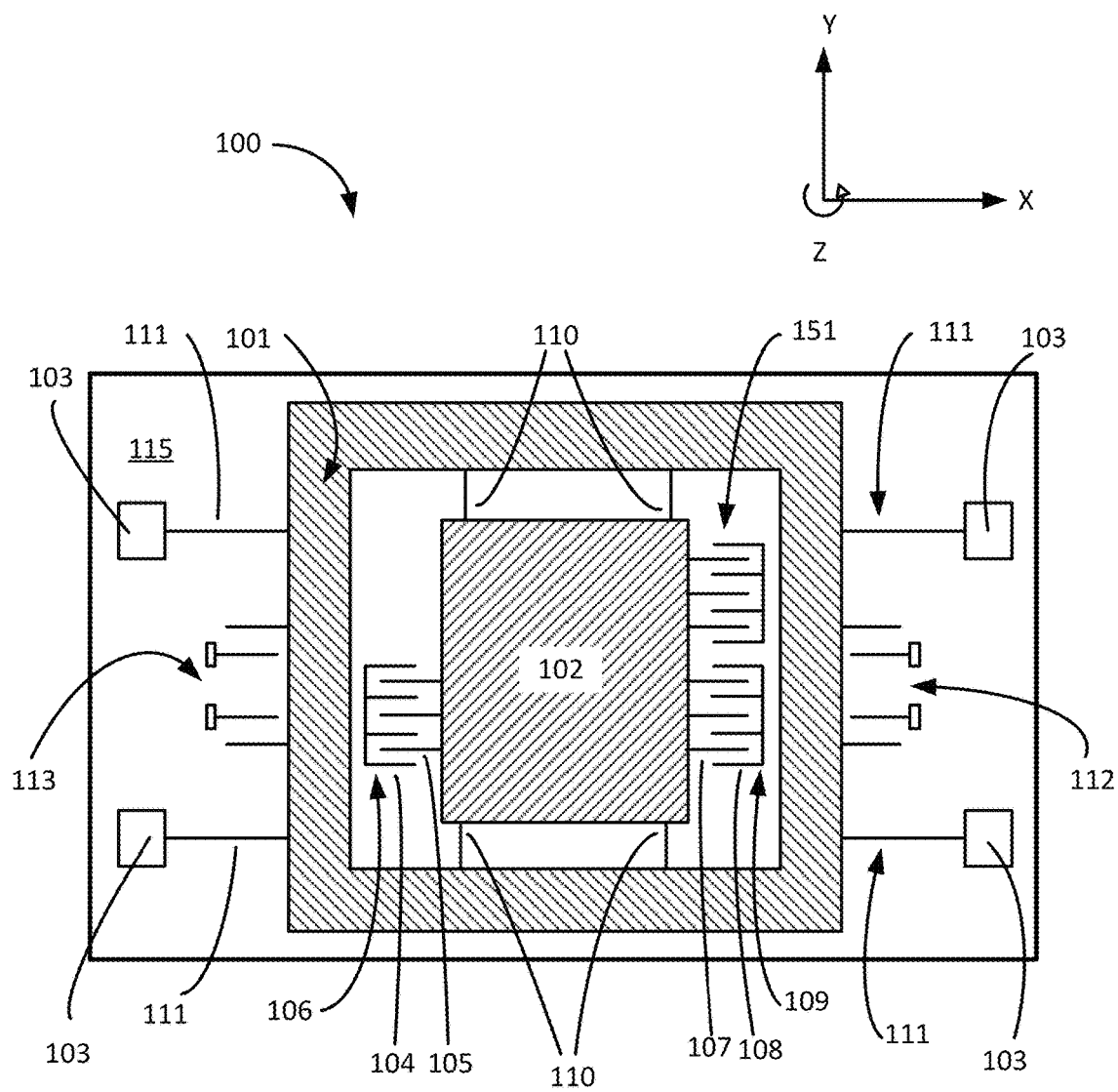
FIG. 1 is a schematic diagram of a MEMS gyroscope in accordance with a first exemplary embodiment.

Various embodiments provide methods of determining the quality factor (Q) of a resonating body in ways that are advantageous over previously known methods. For example, embodiments allow the determination of the quality factor of a resonating body without preventing the simultaneous use of the resonating body, e.g., as part of a sensor such as a gyroscope. In the realm of micromachined ("MEMS") devices, embodiments allow the determination of the quality factor of a resonating body in a manner that is not dependent on transduction parameters of the MEMS device.

In accordance with various exemplary embodiment, the quality factor of a resonator (e.g., an oscillating MEMS resonator) is measured or estimated by driving the resonator continuously between alternating ramp-up and ring-down phases, the ramp-up phases driven using a first drive signal for a first duration, the ring-down phases driven using a second drive signal for a second duration, wherein the first drive signal has a first amplitude and where the second drive signal has a second amplitude less than the first amplitude; making first and second measurements of a parameter associated with resonance of the resonator; and producing an estimation of the quality factor of the resonator based on the first and second measurements.

By way of example, in various alternative embodiments, the parameter of the motion of the resonator may be the amplitude of the motion of the resonator, the velocity of the resonator, the displacement of the resonator, the current flow proportional to the velocity of the resonator, or the charge proportional to the displacement of the resonator. The second drive signal may be a zero amplitude drive signal. The two measurements may be made during the same ramp-up or ring-down phase or during different ramp-up or ring-down phases. The first and second durations may be the same or different.

In various embodiments, the Q-factor of the resonator may be measured while the resonator is in use for another purpose. For example, if the MEMS resonator forms part of a Coriolis gyroscope, the method further includes measuring rotation using the MEMS gyroscope simultaneously with at least one of the first phase and the second phase.

Various exemplary embodiments are explained and illustrated below with reference to a specific type of MEMS gyroscope 100 shown in FIG. 1 as an example, but application of the innovations described herein may be applied to resonating bodies generally, and are not limited to MEMS devices or to gyroscopes or to the specific MEMS gyroscope configuration shown in FIG. 1.

The gyroscope 100 includes an inertial mass (or "shuttle") 102 flexibly suspended from, and within, a frame 101 by flexures 110. The frame 101, in turn, is flexibly suspended from a substrate 115 by outer fixed points 103 and flexures 111. The shuttle 102 and the frame 101 are substantially in the same plane.

Operation of the MEMS gyroscope 100 is based on the Coriolis effect. As such, the exemplary gyroscope has two orthogonal axes. The shuttle 102 is driven to have some velocity along the first axis (the X-axis direction in FIG. 1); in addition, the shuttle 102 is typically a resonant structure and so this axis will be referred to as the Resonator axis. When the gyroscope 100 is rotated about the Z-axis in FIG. 1, there will be a Coriolis force exerted on the frame 101 along the second axis (the Y-axis direction in FIG. 1) due to the Coriolis effect. The second axis is referred to as the Coriolis axis. The effect of the force on the Coriolis axis can be sensed and rotation can be calculated. The gyroscope resonator-axis and associated support circuitry are, collectively, referred to herein as the Resonator Signal Path (RSP).

The primary function of the RSP support circuitry is to drive the inertial mass 102 into motion along the resonator-axis. This is often accomplished through electrostatic actuation. The inertial mass 102 is placed at some voltage potential, and one or more isolated actuating (drive) electrode is placed at some other voltage potential. The potential difference across the gap between the mass and drive electrode creates an attractive electrostatic force. By varying the voltage on the mass, electrode, or both, the force can be varied, exciting the mass into motion.

The gyroscope 100 includes two comb-drive drive capacitors 106, 109, to drive the shuttle 102 into oscillation. In drive capacitor 106, a set of fixed fingers 104 stand on, but are electrically isolated from, the substrate 115. The fixed fingers 104 extend in the direction of, and in the same plane as, the shuttle 102. A corresponding set of shuttle fingers 105 extend from the shuttle and mesh (or interdigitate) with the fixed fingers 104 to form comb drive capacitor 106.

Figure 3:
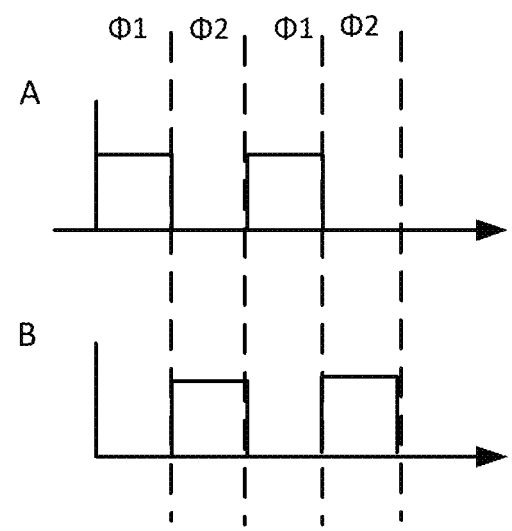
FIG. 3 is a schematic diagram showing drive signals produced by the driver circuit of FIG. 2, in accordance with one exemplary embodiment.

In an illustrative embodiment, the shuttle fingers 105 are held at a bias voltage, while fixed fingers 104 are driven with a periodic signal (for example, a square wave as schematically illustrated in FIG. 3) that causes a voltage difference between the fixed fingers 104 and the shuttle fingers 105.

Another set of shuttle fingers 107 and fixed fingers 108 form a second comb drive capacitor 109 on the opposing side of the shuttle, and are driven by a periodic signal the same as, but 180 degrees out of phase with, the signal driving comb drive capacitor 106, to supply an electrostatic force 180 degrees out of phase with that of the first comb drive capacitor 106.

Figure 2:
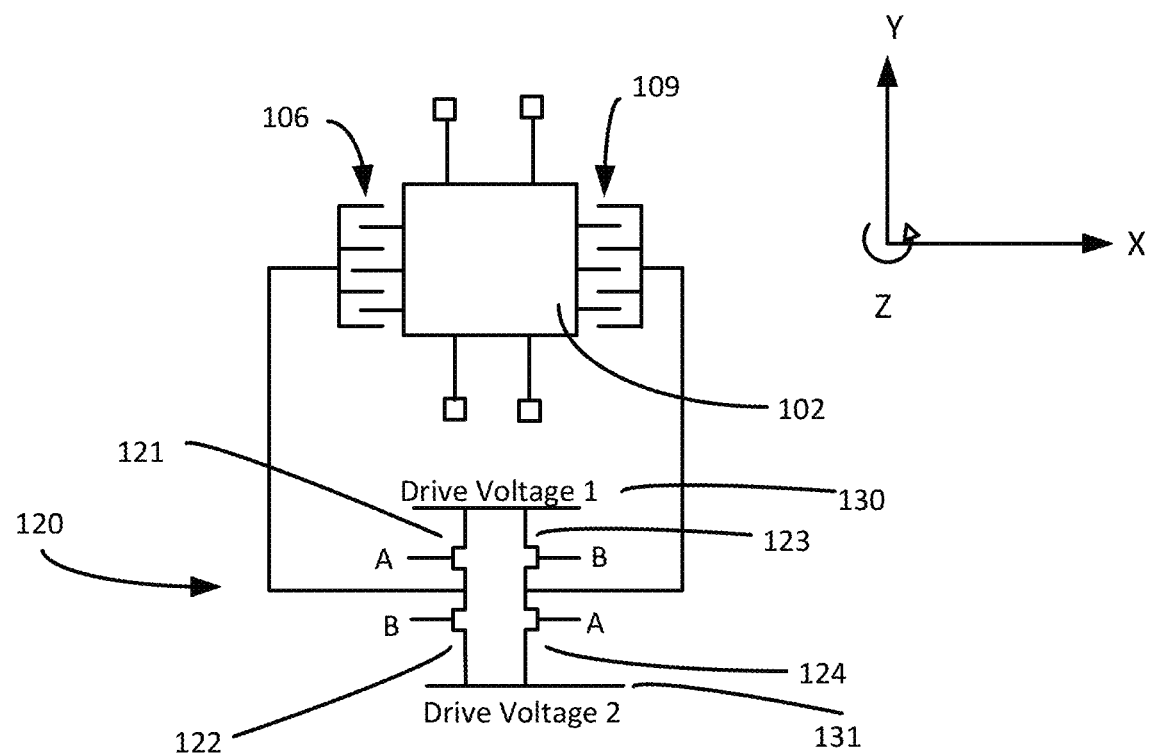
FIG. 2 is a schematic diagram showing a driver circuit for the MEMS gyroscope of FIG. 1, in accordance with one exemplary embodiment.

A driver circuit 120 for the shuttle 102 is schematically illustrated in FIG. 2, and includes two parallel branches of transistors 121, 122, 123 and 124 coupled between a first drive voltage node 130 and a second drive voltage node 131. The shuttle 102 is typically biased to a bias voltage, which may be equal to one of the drive voltages or may be a different voltage. As but one example, the shuttle 102 may have a bias voltage of around 30V and the drive capacitors 106 and 109 may alternate between drive voltages of around 0V and 1.8V. In this exemplary embodiment, as the drive signals of FIG. 3 rise and fall, each of the comb drive capacitors 106 and 109 are alternately coupled to the first drive voltage and the second drive voltage. In this embodiment, when signal A is high (phases Φ1 in FIG. 3), transistor 121 couples the first drive voltage to capacitor 106, and transistor 124 couples capacitor 109 to the second drive voltage. Similarly, when signal B is high (phases Φ2 in FIG. 3), transistor 123 couples the first drive voltage to capacitor 109, and transistor 122 couples capacitor 106 to the second drive voltage. A voltage difference between the shuttle 102 and a particular drive capacitor causes a resulting force on the shuttle 102, and alternating between different drive voltage signals on drive capacitors 106 and 109 causes alternating back-and-forth forces that in turn cause the shuttle 102 to resonate in the desired mode. The driver circuit 120 is typically configured to drive the shuttle 102 for a first predetermined amount of time (referred to herein as "Tu") during the ramp-up phase, e.g., by driving the shuttle 102 a predetermined number of Φ1/Φ2 cycles at a predetermined drive frequency using a first pair of drive voltages, and to drive the shuttle 102 for a second amount of time (referred to herein as "Td") during the ring-down phase, e.g., by driving the shuttle 102 a predetermined number of Φ1/Φ2 cycles at the predetermined drive frequency using a second pair of drive voltages different than the first pair of drive voltages or by applying a fixed voltage (e.g., 0 Volts) to both drive electrodes 106 and 109. Representations of ramp-up time Tu and ring-down time Td are shown schematically in FIG. 13. The drive signal can be characterized by a "duty cycle" equal to Tu/(Tu+Td). The ramp-up time Tu (e.g., the number of ramp-up Φ1/Φ2 cycles), the ring-down time Td (e.g., the number of ring-down Φ1/Φ2 cycles), the ramp-up drive voltages, and/or the ring-down drive voltages can be varied in response to the measured value of Q. Thus, for example, the drive force applied to the shuttle 102 during ramp-up phases may be reduced in response to determining that Q has increased or may be increased in response to determining that Q has decreased. The sum of Tu and Td and the ratio of Tu and Td can be programmable and therefore the frequency of ramp-up and ring-down and the duty cycle of ramp-up and ring-down can be programmed, e.g., based on measured Q values as discussed herein. Other types of post-processing corrections additionally or alternatively may be made based on measured Q values.

In one exemplary embodiment, charges on the comb-drive capacitors 106, 109 produce electrostatic forces acting on the shuttle according to the following equation:

$$Force = \varepsilon N b V^2 / d$$

where:
(i) ε is the permittivity of the space between the fingers, and is a physical constant depending on the material between the fingers;
(ii) N is the number of fingers;
(iii) b is the effective thickness of the structural layer;
(iv) V is the voltage difference between the fingers; and
(v) d is the distance between the fingers.

The electrostatic force imposed by the voltage difference between the shuttle fingers and the fixed fingers that are coupled to the drive voltage will pull the shuttle 102 in the direction of those fixed fingers. As the drive signals alternate, the shuttle 102 will be subjected to alternating electrostatic forces and will therefore vibrate back and forth around the nominal center point of the shuttle. Thus, the capacitors 106 and 109 can be said to be driven in anti-phase with one another in order to produce the alternating back-and-forth forces on the shuttle 102.

As is known in the art, if the frame 101 and its vibrating shuttle 102 are subject to a rotation about an axis perpendicular to the plane of the frame 101 and the shuttle 102, then Coriolis acceleration will cause the frame to move along an axis in the plane, perpendicular to the axis of vibration of the shuttle. This Coriolis acceleration can be detected with an accelerometer, and the acceleration information can be processed to yield information about the rotation. In FIG. 1, the shuttle 102 vibrates along the X-axis (in the plane of the page), and the rotation axis is parallel to the Z-axis (normal to the page). Rotation of the gyroscope about a point in the Z-axis when the shuttle 102 is vibrating will cause the frame 101 to move along the Y-axis (in the plane of the page, and perpendicular to the X-axis). The motion of the frame is detected using sense capacitors 112 and 113 (which are shown here as parallel plate capacitors). The drive capacitors 106 and 109 are independent of the sense capacitors 112 and 113.

A resonating body, such as shuttle 102 for example, may be characterized, in part, by its quality factor, which may be referred to as its "Q-factor," or simply as its "Q." A system's Q-factor is a measure of its resonance characteristics.

For example, in a MEMS device, the displacement of the shuttle (or alternately, the amplitude of the shuttle's cyclical displacement) will reach a maximum (A1) at a given frequency 201, which may be known as the shuttle's "resonant" frequency (which may be designated as "fo"). At other frequencies, the displacement of the shuttle will be less than its displacement at the resonant frequency, as also schematically illustrated in FIG. 6. At some frequency 202 above the resonant frequency (which may be known as the upper 3 dB frequency), and at another frequency 203 below the resonant frequency (which may be known as the lower 3 dB frequency), the magnitude of the displacement of the shuttle will be decreased by around $\sqrt{2}$ (0.71 A1).

Figure 6:
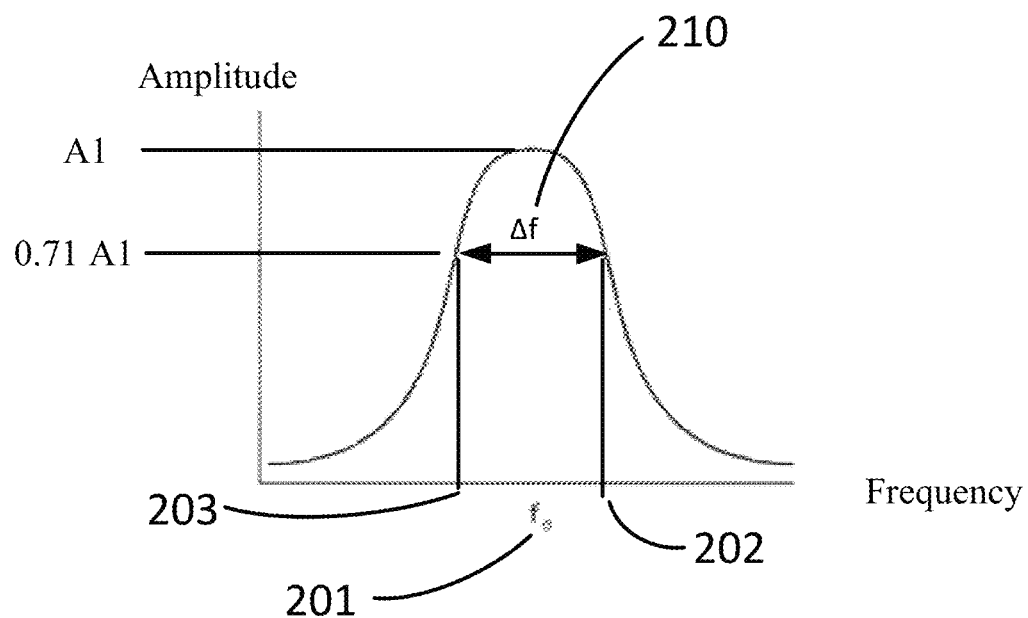
FIG. 6 schematically illustrates the relationship between resonator amplitude and frequency, in accordance with one exemplary embodiment.

The Q of an oscillating shuttle can then be defined as the ratio of the resonant frequency (fo) divided by the difference ($\Delta f$ or delta-f) between the upper 3 dB frequency and the lower 3 dB frequency. In FIG. 6, the Q is the peak or resonant frequency (i.e., fo 201) divided by the frequency difference 210 between upper 3 dB frequency 202 and lower 3 dB frequency 203. As such, Q is a dimensionless parameter.

Figure 7:
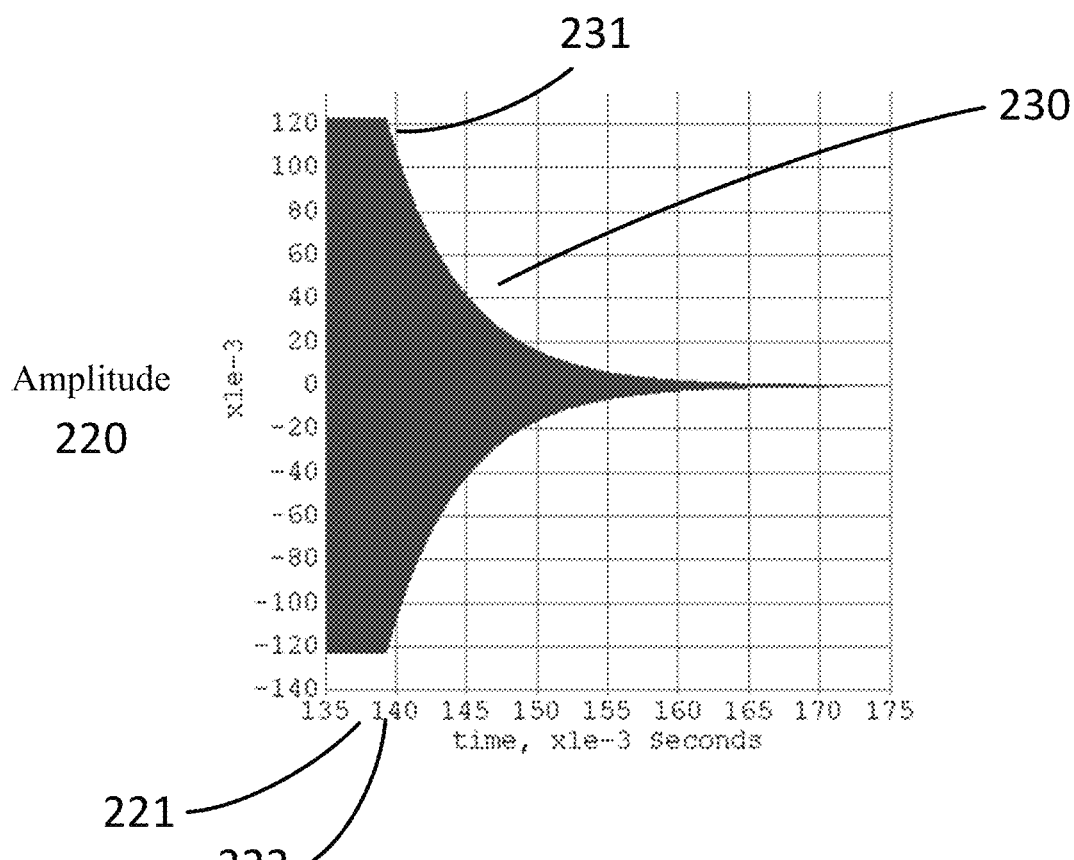
FIG. 7 is a schematic diagram showing ring-down of a resonating body, in accordance with one exemplary embodiment.

FIG. 7 schematically illustrates the amplitude 220 of the displacement due to vibration of a resonating body, such as shuttle 102 for example. The amplitude 220 is a function, in part, of the drive forces applied across the drive capacitors 106, 109, which are in turn functions, in part, of the amplitude of the drive signals A, B. Generally, the larger the amplitude of a drive signal, the larger the amplitude 220 of the displacement of the shuttle 102. In addition, the larger the amplitude 220 of the displacement of the shuttle 102, the greater the amplitude of velocity of that shuttle 102 as it vibrates.

When driven with a constant-amplitude periodic (e.g., sinusoidal) force along an axis (e.g., the X-axis), the amplitude 220 of the shuttle's motion in that axis remains constant, as schematically illustrated by the amplitude 220 at time 221. If the drive force is removed or reduced, however, the amplitude of the vibration decays exponentially with time (referred to herein as "ring-down"). For example, in FIG. 7, the drive force is removed at time 222, and the decay of the amplitude of the vibration is schematically illustrated by the curve 230 of the amplitude 220. The time-constant of that decay curve 230 (which is the envelope of the resonator's displacement/velocity) is a function, in part, of the Q-factor of the shuttle 102. The inventors have realized that the portion 231 of the curve 230 is nearly a line in the time immediately following the removal of the drive force at time 222, and have also realized that the (absolute value of the) slope of that portion 231 of the curve 230 is a good approximation of the Q-factor of the shuttle 102.

Figure 8:
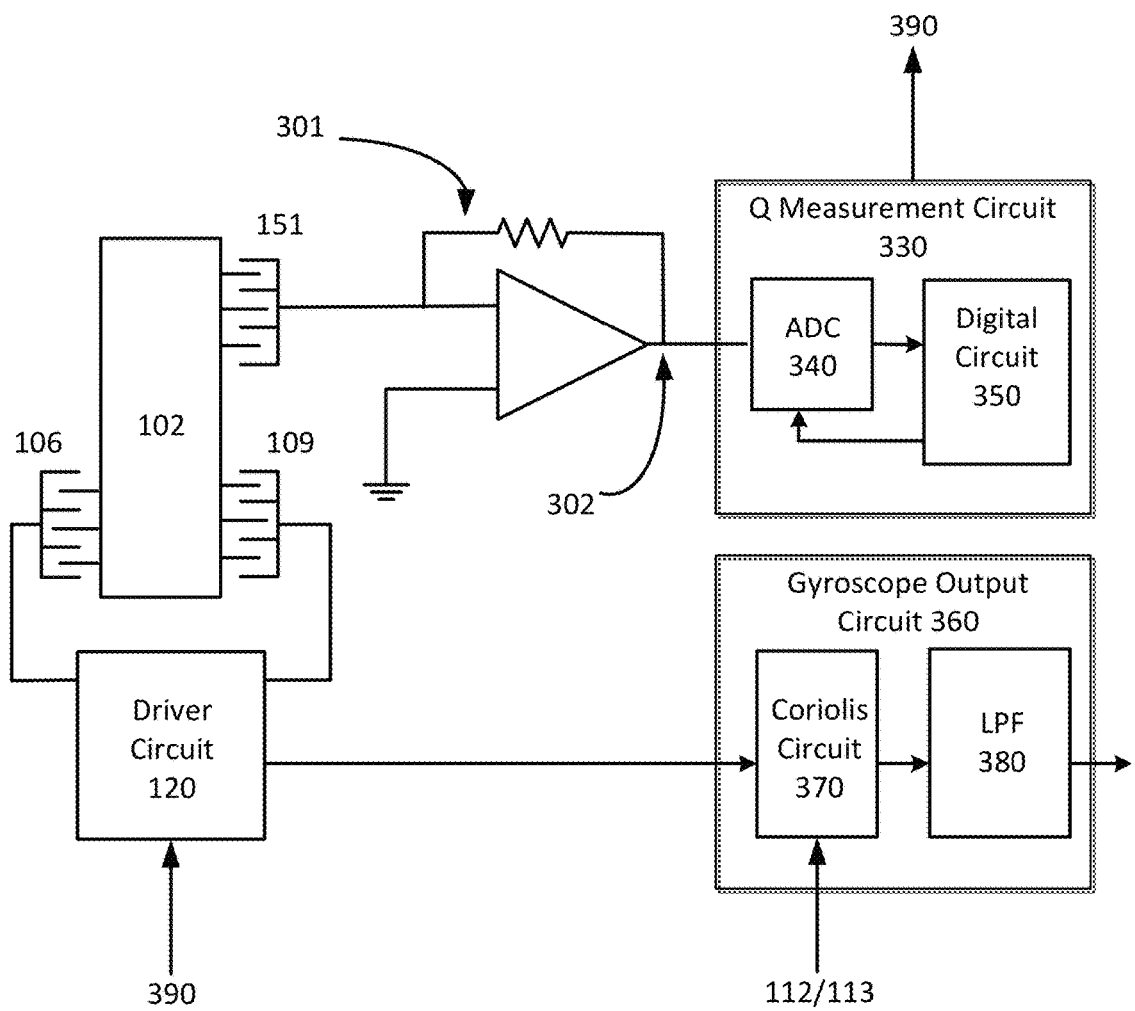
FIG. 8 is a schematic diagram showing Q measurement and gyroscope output circuitry for the MEMS gyroscope of FIG. 1, in accordance with one exemplary embodiment.

In some situations, it may be desirable to measure or estimate the Q of a device. FIG. 8 is a schematic diagram showing a circuit 300 in accordance with one exemplary embodiment. Among other things, the circuit 300 measures the current flowing out of the velocity sensing capacitor 151 at various times as the shuttle 102 is driven by the driver circuit 120 via the drive capacitors 106, 109; this current varies with, and is proportional to, the motion of the shuttle 102. For the sake of simplicity, only one velocity sensing capacitor 151 is shown in the exemplary embodiment of FIG. 1, although alternative embodiments may have a complementary velocity sensing capacitor on the other side of the shuttle 102 next to drive capacitor 106.

In this exemplary embodiment, the circuit 300 includes a transimpedance amplifier 301, as schematically illustrated in FIG. 8, coupled to the velocity sensing capacitor 151. In operation, the transimpedance amplifier 301 transduces current flowing from capacitor 151 to a voltage at amplifier output 302, to produce a voltage signal that is proportional to the current through the velocity sensing capacitor 151, which may be used to determine or estimate the Q-factor of the shuttle 102.

It should be noted that the current through capacitor 151 is proportional to the velocity of the shuttle 102. Consequently, the voltage signal output 302 of the transimpedance amplifier 301 is proportional to the current though capacitor 151, and therefore proportional to the velocity of the shuttle 102. The values of the output of the amplifier 301 at different times represent the velocity of the shuttle 102 at those different times. Those output values may be used to evaluate the Q-factor of the resonating shuttle 102 by calculating the slope of a line defined by those two output values (in other words, the two values of the output of the amplifier 301 at two different times define a line that has a slope).

In another embodiment, the amplifier 301 may be a capacitive transimpedance amplifier, which measures the displacement of the shuttle 102 rather than its velocity. Two sequential measurements of the decaying amplitude of the displacement of the shuttle 102 may be used to calculate the slope of that decay, which (as described herein) can be used to form an approximation of the shuttle's Q-factor.

It should also be noted that the current through the capacitor 151 may vary with other parameters, possibly including spatial offset of the shuttle 102 and/or the bias voltage across capacitor 151. Such parameters may be known as transduction parameters.

In some embodiments, the output 302 of transimpedance amplifier 301 is provided to an analog-to-digital converter (ADC) 340, and the digitized output represents the current though the capacitor 151 at the moment of sampling.

The digitized output from the ADC 340 may be provided to a programmed microprocessor, state machine, or other digital circuit 350 for subsequent processing (e.g., according to method 400, as describe below).

In various embodiments, methods of estimating the Q-factor of a resonating body include finding the slope of the decaying amplitude of the resonating member. For example, the envelope of the decay may be measured at two known points in time, and the absolute value of the slope can be determined as the difference between the amplitudes divided by the time between the measurements. Because the velocity of the resonating body corresponds to the amplitude of its vibration, the estimate of Q-factor may also be determined by measuring the velocity or displacement of the resonating body at two points in time, and the absolute value of the slope can be determined as the difference between the velocities or displacements divided by the time between the measurements.

Figure 9:
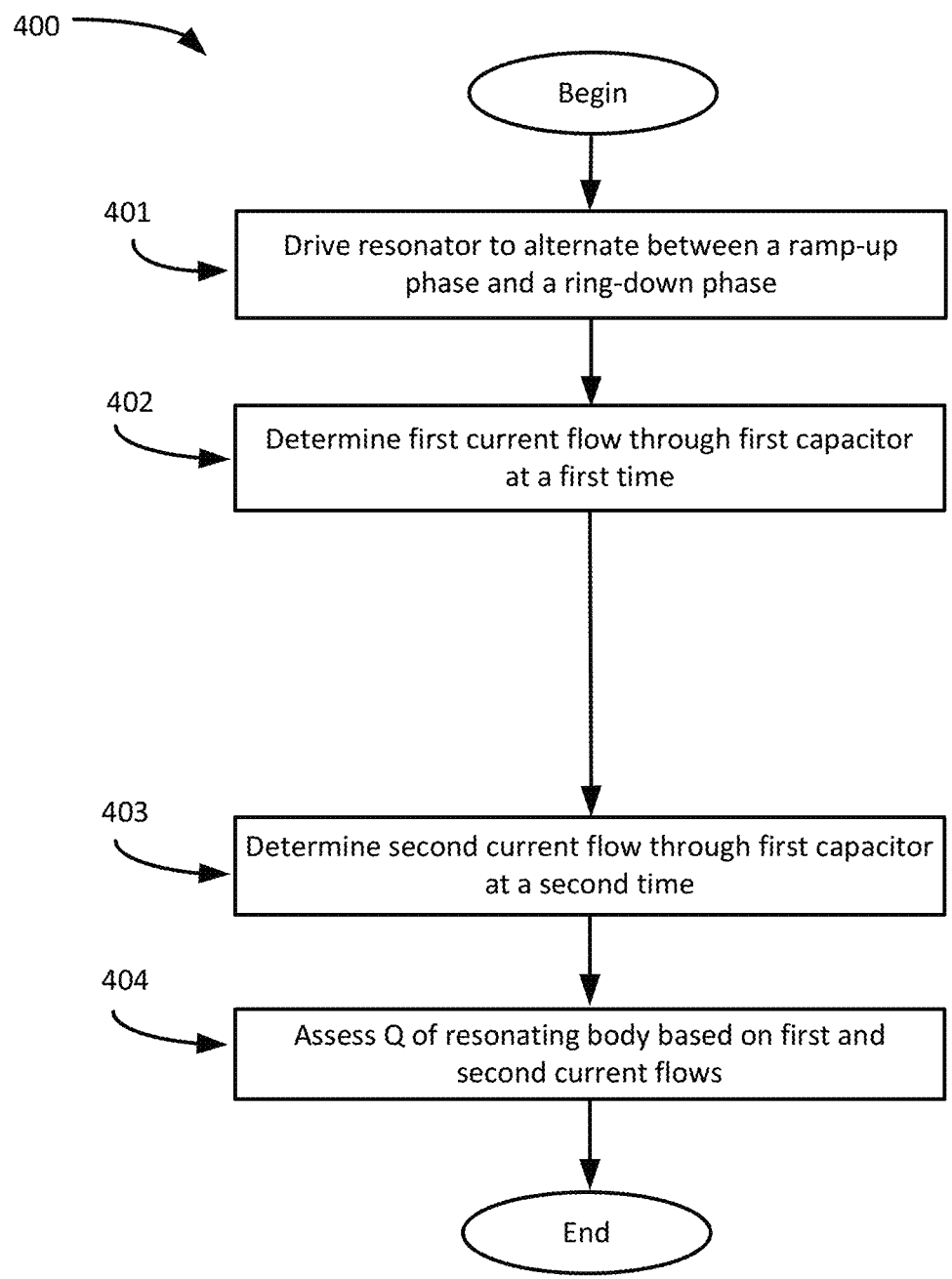
FIG. 9 is a logic flow diagram for estimating the qualify factor Q of the shuttle 102 of the gyroscope 100 of FIG. 1, in accordance with one exemplary embodiment.

FIG. 9 is a logic flow diagram for a method 400 for estimating the quality factor Q of the shuttle 102 of the gyroscope 100 of FIG. 1, in accordance with one exemplary embodiment. The method 400 involves driving the body to vibrate at two different amplitudes at two different times, and assessing the current flow in a velocity-sensing capacitor. As described in more detail below, the shuttle 102 is driven with two different drive force magnitudes, periodically switching between the two. For example, in one embodiment, the two magnitudes are maximum (rail-to-rail drive) and zero, but any two different magnitudes could be used. When switching from one drive force to another, the shuttle 102 will respond with a time constant proportional to Q. If the period of each drive force magnitude is fixed, then the change in amplitude of the velocity response will vary with Q (as the time constant changes). This change in amplitude can be used as a measure of Q.

Figure 10:
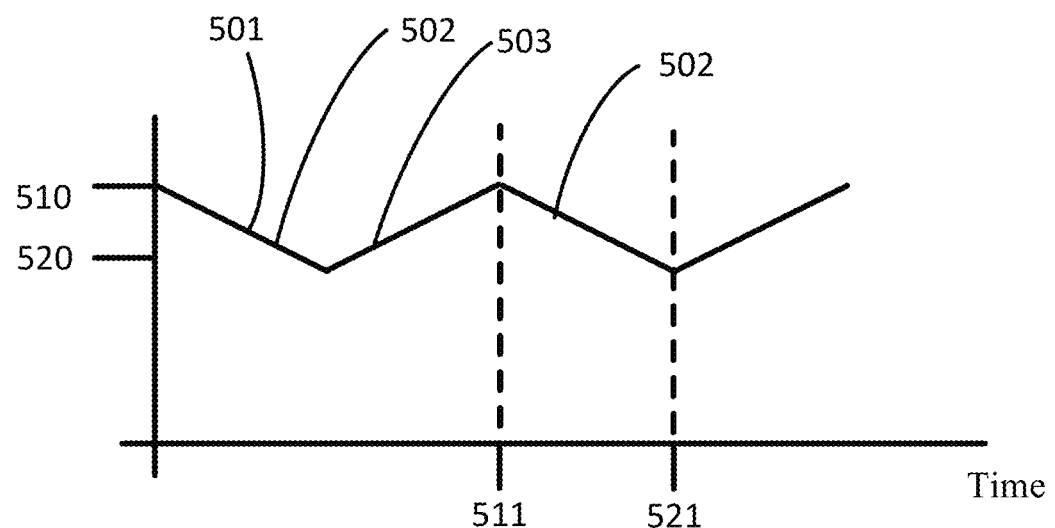
FIG. 10 schematically illustrates estimation of the quality factor based on measurements made relative to the beginning and end of ring-down phase, in accordance with one exemplary embodiment.
Figure 11:
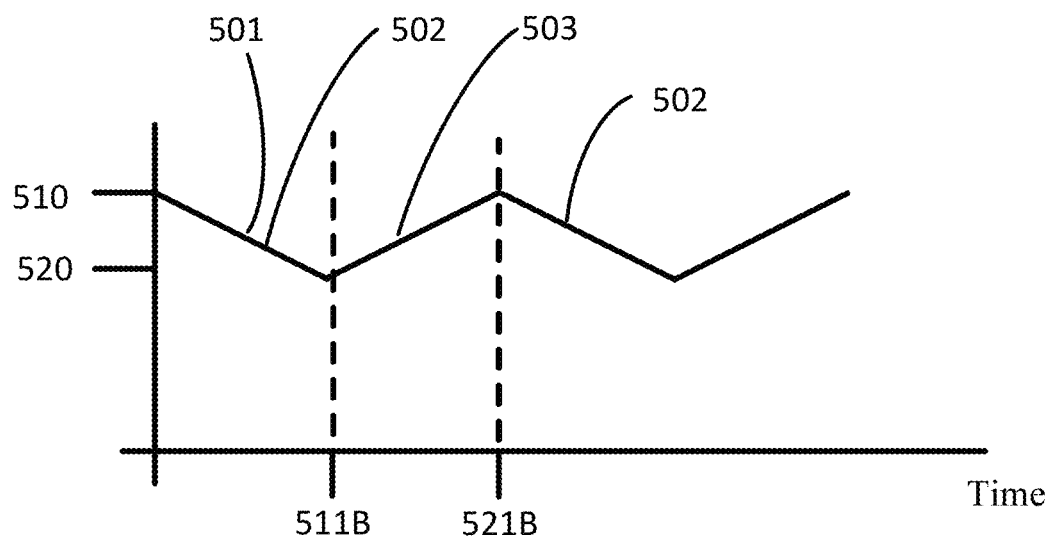
FIG. 11 schematically illustrates estimation of the quality factor based on measurements made relative to the end of ring-down phase and the end of ramp-up phase, in accordance with one exemplary embodiment.

FIGS. 10 and 11 schematically illustrate the envelope of the velocity of the shuttle 102 with time, as the drive amplitude of the shuttle (and therefore, its velocity) changes in response to changes in the drive magnitude. Specifically, the velocity increases (rising slope 503 of line 501) when the drive force is changed from lower to higher, and decreases (falling slope 502 of line 501) when the drive force is changed from higher to lower. FIG. 10 is used to schematically illustrate estimation of the quality factor based on measurements made relative to the beginning and end of the ring-down phase, in accordance with one exemplary embodiment. FIG. 11 is used to schematically illustrate estimation of the quality factor based on measurements made relative to the beginning and end of the ramp-up phase, in accordance with another exemplary embodiment.

With reference to FIG. 9, as an illustrative embodiment, in the gyroscope 100, at step 401, the shuttle 102 is driven to alternate between a ramp-up phase and a ring-down phase by applying a drive signal to drive capacitors 106 and 109 as discussed above so as to alternate between a maximum velocity 510 and a minimum velocity 520. The drive signal may be applied for a pre-determined amount of time, or a pre-determined number of vibration cycles, in each phase, and the time/cycles may be the same in both the ramp-up and ring-down phases or may be different in the ramp-up and ring-down phases. In one exemplary embodiment, the drive signal having the first amplitude is applied for four (4) cycles of oscillation of the shuttle 102. In other embodiments, a different number of cycles could be used (e.g., 100, 160, 200, etc.).

Then, step 402 measures the current flow through the velocity sensing capacitor 151 at a first time (e.g., at time 511 in FIG. 10 or at any time after time 511 and before time 521). Therefore, the value of the current through capacitor 151 at time 511 represents the velocity of the shuttle 102 at the moment of sampling. This measured current is referred to below as I-high.

Then, step 403 measures the current flow through the velocity sensing capacitor 151 at a second time (e.g., after the first time and at or before time 521 in FIG. 10). This measured current is referred to below as I-low.

In some embodiments, the measured currents may be digitized and stored in memory or sent to a programmed processor for later use.

Because the amplitude of the shuttle 102 is ramping, the velocity of the shuttle 102 at the first and second measurements will be different. For example, when measuring during a ring-down phase, the velocity of the shuttle 102 at the second measurement will be less than the velocity of the shuttle 102 at the first measurement, and so I-low will be less than I-high. When measuring during a ramp-up phase, however, the velocity of the shuttle 102 at the second measurement will be greater than the velocity of the shuttle 102 at the first measurement and so I-low will be greater than I-high.

The Q-factor of the shuttle 102 can then be found at step 404, e.g., as the absolute value of the slope of the velocity (501) of the shuttle 102 between the two measurements. For example, where the currents at times 511 and 521 are known, the difference between those currents represents the change in current over the N cycles during which second drive signal was applied to the shuttle 102. The slope of the line 501 between times 511 and 521 represents a number proportional to the Q-factor of the shuttle 102 (i.e., Q≈1/Slope), and may be found by the following formula:

$$\text{Slope} = (I\text{-high} - I\text{-low})/N$$

where N is the number of cycles between I-high and I-low (different than N used in the Force equation above).

The inventors have realized that the current through the velocity sensing capacitor 151 may vary depending on other parameters (i.e., transduction parameters), and so in some embodiments, assessing the Q-factor of the vibrating shuttle 102 involves normalizing the current flow.

For example, the inventors have identified the following relationship:

$$(I\text{-high} - I\text{-low})/I\text{-avg} = N\pi/Q;$$

Where:
I-high and I-low are as defined above;
I-avg is the mathematical average of I-high and I-low or any weighted averages of I-high and I-low;
N is the number of cycles between I-high and I-low (different than N used in the Force equation above);
π is a mathematical constant ("pi"); and
Q is the quality factor.

Rearranging the foregoing equation for Q yields:

$$Q \approx \frac{I_{avg}}{I_{high} - I_{low}} N\pi$$

$$I_{avg} = V_{dr} \, \text{duty} \left(\frac{\partial C}{\partial x}\right)_{rd} V_b \frac{Q}{m\omega} \left(\frac{\partial C}{\partial x}\right)_{rs} V_b$$

$$I_{high} - I_{low} = I_{avg} \frac{N\pi}{Q} = V_{dr} \, \text{duty} \left(\frac{\partial C}{\partial x}\right)_{rd} V_b \frac{Q}{m\omega} \left(\frac{\partial C}{\partial x}\right)_{rs} V_b \times \frac{N\pi}{Q}$$

where Vdr is the drive voltage, duty is the duty-cycle of the higher drive force, Vb×(dC/dx)rd and Vb×(dC/dx)rs are the resonator drive and sense transductions, and Q/(mω) is the resonator response at resonant frequency.

Thus, the force exciting the shuttle 102 may be controlled by a separate loop such that I-avg remains constant. The separate loop to control I-avg changes the drive voltage and/or the duty cycle of the first and/or second drive signals. The force exciting the shuttle 102 at resonance may be modulated with a periodic signal with a fixed frequency and duty cycle, in which case Q can be determined by I-avg. In addition, Q can be determined from the ratio of I-avg/(I-high−I-low), which is proportional to Q without transduction terms (i.e., the transduction terms cancel out). For a fixed drive voltage and duty cycle, (I-high−I-low) is a function of transductions and is independent of Q. I-avg and (I-high−I-low) can be measured independently, e.g., using completely different signal paths or by time-multiplexing the same signal path.

In other embodiments, I-avg may be replaced with another value of current. For example, one embodiment uses I-low instead of I-avg. This provides the benefit of not having to calculate I-avg, yet still should yield an acceptable estimation of Q. Similarly, another embodiment may use I-high instead of I-avg.

Yet other embodiments may use a weighted sum of I-high and I-low instead of I-avg. For example, a weighted sum may be calculated at M(I-high)+N(I-low), where M and N are decimals between 0.0 and 1.0 and M+N=1.0.

Some embodiments may sample the velocity of the shuttle 102 between the application of the low drive force and the higher drive force relative to times 511B and 521B in FIG. 11 for example, i.e., during ramp-up from time 511B to time 521B. That data may be used as described above, but involves the use of the absolute value of the difference between I-high (from time 521B) and I-low (from time 511B) to avoid producing a negative Q.

Thus, estimating the quality factor of a resonator may involve driving the resonator between alternating ramp-up and ring-down phases, the ramp-up phases driven using a first drive signal for a first duration, the ring-down phases driven using a second drive signal for a second duration, wherein the first drive signal has a first amplitude and where the second drive signal has a second amplitude less than the first amplitude; making first and second measurements of a parameter associated with resonance of the resonator; and producing an estimation of the quality factor of the resonator based on the first and second measurements. In this context, each phase can be said to begin at the time the drive signal is switched from one drive signal to the other drive signal and to end at the time the drive signal is switched back such that the time of switching can be both the end of a ramp-up phase and the beginning of a ring-down phase or can be both the end of a ring-down phase and the beginning of a ramp-up phase (e.g., with reference to FIGS. 10 and 11, times 511 and 521B can be considered both the end of a ramp-up phase and the start of a ring-down phase, while times 521 and 511B can be considered both the end of a ring-down phase and the start of a ramp-up phase). Measurements made during a ring-down phase may be made at times 511 and 521 or at two times between times 511 and 521 inclusive, while measurements made during a ramp-up phase may be made at times 511B and 521B or at two time between times 511B and 521B inclusive. In some exemplary embodiments, one measurement is made during a ramp-up phase while the other measurement is made during a ring-down phase.

Figure 12:
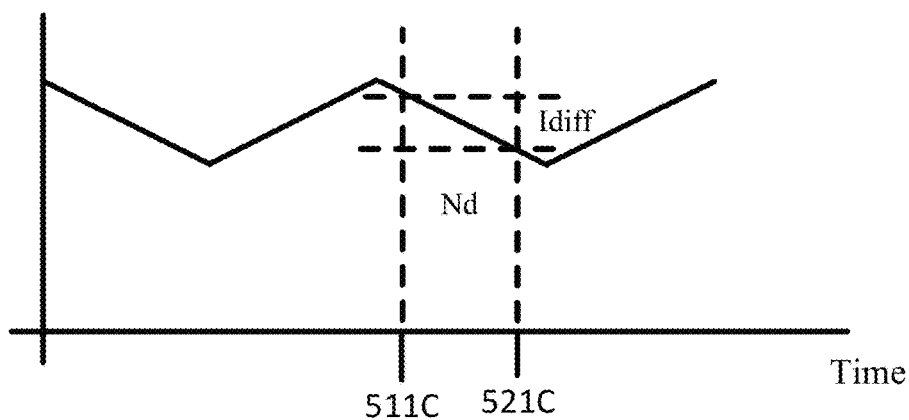
FIG. 12 is used to schematically illustrate estimation of the quality factor based on measurements made during a single ring-down phase, in accordance with one exemplary embodiment.

FIG. 12 is used to schematically illustrate estimation of the quality factor based on measurements made during a single ring-down phase, in accordance with one exemplary embodiment. This is essentially a generalized case of the example discussed above with reference to FIG. 10. Here, a first current measurement (I-high) is taken at time 511C and a second current measurement (I-low) is taken Nd cycles of the ring-down drive signal later at time 521C, and Q is estimated based on Nd and the difference between the two current measurements (Idiff=I-high−I-low) as discussed above. Specifically:

$$Q = Nd * \pi * (I\text{-avg}/I\text{diff})$$

Figure 13:
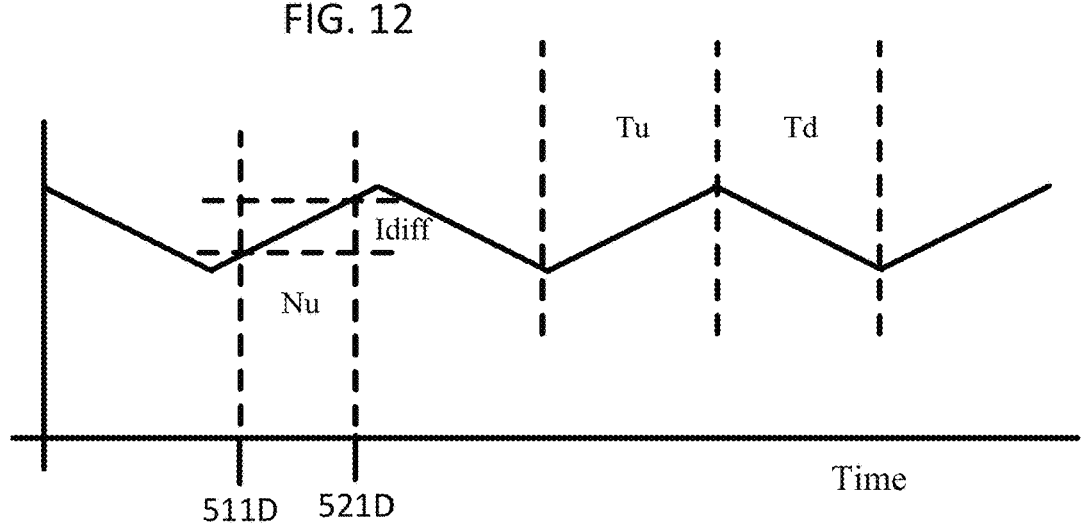
FIG. 13 is used to schematically illustrate estimation of the quality factor based on measurements made during a single ramp-up phase, in accordance with one exemplary embodiment.

FIG. 13 is used to schematically illustrate estimation of the quality factor based on measurements made during a single ramp-up phase, in accordance with one exemplary embodiment. This is essentially a generalized case of the example discussed above with reference to FIG. 11. Here, a first current measurement is taken at time 511D and a second current measurement is taken Nu cycles of the ramp-up drive signal later at time 521D, and Q is estimated based on Nu and the difference between the two current measurements Idff. Specifically:

$$Q = (Nu*(1-d)/d) * \pi * (I\text{-avg}/I\text{diff})$$

where d=Tu/(Tu+Td); and

Tu is the ramp-up time and Td is the ramp-down time (note that Tu and Td can be the same or different in various alternative embodiments).

Figure 14:
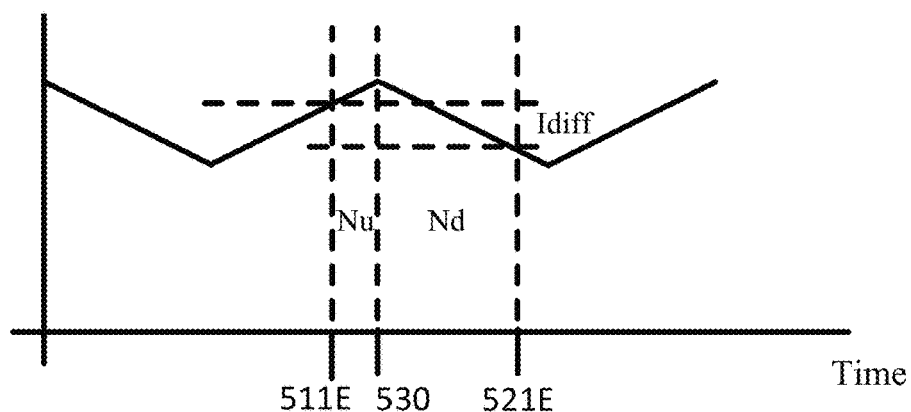
FIG. 14 is used to schematically illustrate estimation of the quality factor based on measurements made during both a ramp-up phase and a ring-down phase, in accordance with one exemplary embodiment.

FIG. 14 is used to schematically illustrate estimation of the quality factor based on measurements made during both a ramp-up phase and a ring-down phase, in accordance with one exemplary embodiment. Here, a first current measurement is taken during the ramp-up phase at time 511E and a second current measurement is taken during the subsequent ring-down phase at time 521E, after Nu cycles of the ramp-up drive signal and Nd cycles of the ring-down drive signal. Q is estimated based on Nu, Nd, and the different between the two current measurements Idiff. Specifically:

$$Q = (Nd - Nu*(1-d)/d) * \pi * (Iavg/Idiff)$$

where d=Tu/(Tu+Td); and

Tu is the ramp-up time and Td is the ramp-down time.

It should be noted that a MEMS device using a resonating body, such as a gyroscope for example, can perform its intended function even while the Q-factor of the resonating body is being estimated according to various embodiments. To that end, the first drive signal and second (lower amplitude) drive signal are continuously repeated. This may be referred to as "continuous operation." In general, the drive amplitude always goes back and forth between the two drive forces, and the duration of each should be much less than the resonator time constant. Also note, however, that in some embodiments, the duration of each phase does not have to be less than the resonator time constant if decreased accuracy (e.g., due to the decreased approximation of the decay 230 being a line) is acceptable, and/or if the method of finding Q-factor involves higher order calculations (i.e. use an approximation better than just a straight line; more elements of Taylor series expansion; etc.).

It should also be noted that the short-duration changes in drive magnitude described above (each less than the time constant of the shuttle's ring down decay) will not adversely impact the operation of the gyroscope 100, even though the amplitude of the shuttle's vibration begins to decrease when the second drive level is applied. Consequently, the Q-factor of a device may be measured even when the device is in operation. For example, in order to find the Q-factor of a resonating beam using a ring-down approach, in which drive forces from a resonating beam are removed and the decay of amplitude measured (e.g., FIG. 7), drive forces would have to be withheld long enough for the amplitude to decay to a point where the curve of the decay could be accurately measured. Therefore, one benefit of present embodiments is that a device having a resonating member (e.g., shuttle 102) can be maintained in operation (e.g., in the case of a gyroscope, the shuttle may still be driven and the gyroscope may continue to sense rotation) even while the Q-factor of the resonating member is being measured.

Generally speaking, the closer the duration of the time during which the curve 230 is approximated as a line is to the time constant of the exponential decay curve 230, the larger the approximation error will be in estimating the Q-factor of the shuttle 102. Thus, the Q-factor estimation will generally be better when the duration of the time during which the curve 230 is nearly a line is significantly less than the time constant of the exponential decay curve 230.

Furthermore, when a resonator is driven to very large amplitudes, the resonance can become non-linear, meaning that the resonance parameters are a function of displacement magnitude. By measuring Q based on small perturbations around the nominal displacement, a more accurate in-situ measurement of Q can be obtained.

As known in the art, the gyroscope produces a gyroscope output based on signals from sense capacitors 112, 113, which in the exemplary embodiment of FIG. 1 are based on Y-axis movements of the frame 101 due to Z-axis rotation of the gyroscope. Thus, in one exemplary embodiment, the circuit 300 shown in FIG. 8 includes a gyroscope output circuit 360 including a Coriolis circuit 370 that demodulates the sense signals from sense capacitors 112, 113 with the drive signal from the driver circuit 120. As will be appreciated, the high frequency switching of the drive signal between the first drive signal and the second drive signal, particularly during continuous operation in which the drive alternates back and forth between the two drive forces, results in a corresponding high-frequency component in the sense signals from the sense capacitors 112, 113 due to coupling between the motion of the shuttle 102 and the Coriolis-induced motion of the frame 101. If the frequency of switching between drive signal levels is significantly faster (higher-frequency) than the bandwidth of the gyroscope (Δf/2 in FIG. 6), then the gyroscope will itself act as an effective filter to reject the high-frequency switching signal. However, there are also applications in which it may be desirable to switch between drive signal levels at a frequency comparable to, or less than, the intrinsic gyroscope bandwidth, but faster than the overall system bandwidth. An example would be rotation sensing for navigation, in which the gyroscope intrinsic bandwidth might be several hundred Hz, whereas the rotation signals of interest lie within a 50 Hz bandwidth. In cases such as this, the high-frequency component can be filtered out of the gyroscope output, e.g., by a low-pass filter (LPF) 380. It should also be noted that the same filtering can be achieved with a band-pass filter prior to demodulation of the Coriolis signal by circuit 370. In this way, not only can the Q-factor of a device may be measured even when the device is in operation, but also the Q-factor measurement should not substantively affect the signal-to-noise ratio of the gyroscope output. Furthermore, by alternating back and forth between the two drive forces in a continuous mode, the driver circuit 120 typically can be configured without a servo loop to maintain the shuttle 102 at a fixed amplitude of displacement, thereby reducing the complexity and cost of the gyroscope. Instead, the amplitude of displacement can be controlled via the duty cycle of the two drive signal levels (i.e. how many cycles the shuttle is driven with the first drive signal relative to the second drive signal), and can be set in an open-loop fashion.

Different systems and application may have different tolerances for withstanding changes in drive magnitude, so the four-cycle change of amplitude described above is merely an example.

As discussed above, the mean drive force can be changed based on measured Q values, e.g., by changing the drive force amplitude of the first and/or second drive signal, or by keeping the drive signal amplitudes fixed but varying the proportion of time the first and/or second drive signals are applied. Thus, with reference again to FIG. 8, the Q measurement circuit 330 may output a signal 390 providing information about the measured value of Q. This signal 390 may be used, e.g., by the driver circuit 120, to adjust the amplitude and/or duration of one or both of the drive signals applied to the shuttle 102.

Figure 4:
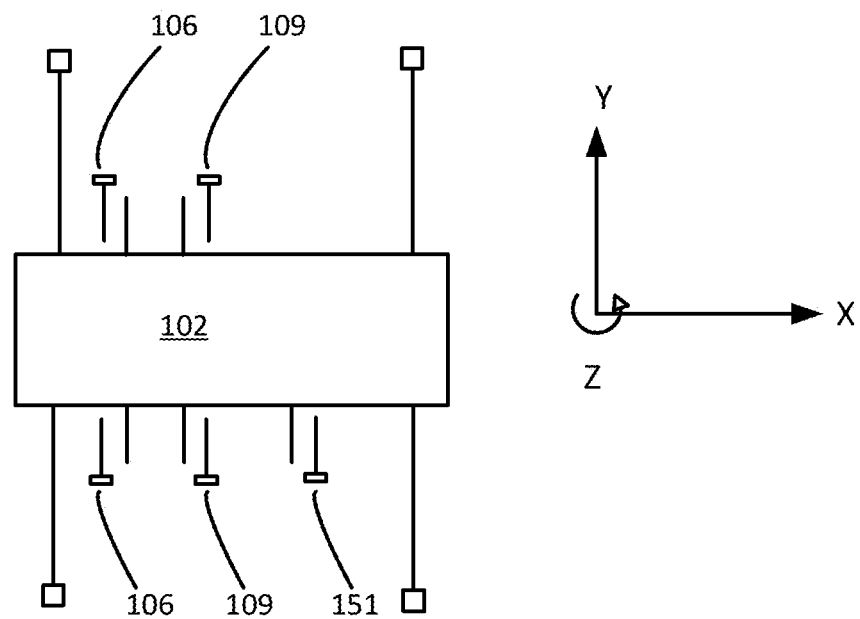
FIG. 4 is a schematic diagram of a MEMS gyroscope in accordance with a second exemplary embodiment.
Figure 5:
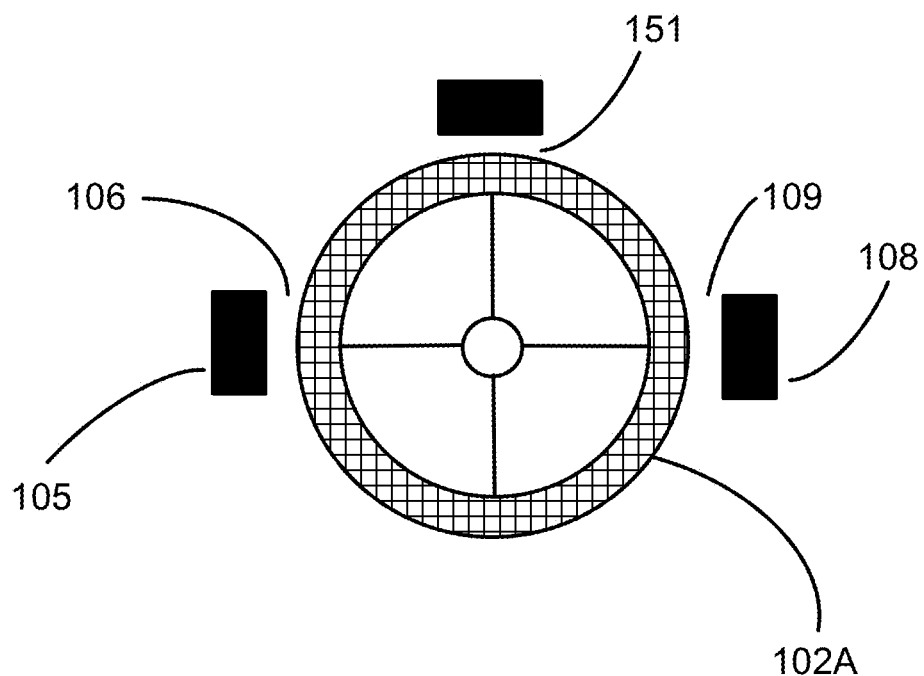
FIG. 5 is a schematic diagram of a MEMS gyroscope in accordance with a third exemplary embodiment.

The innovative principles disclosed herein are not limited to application in MEMS gyroscopes of the type shown in FIG. 1, but can be applied to other applications of resonating structures. For example, FIG. 4 schematically illustrates a shuttle 102 of a MEMS gyroscope in which the drive capacitors 106 and 109 are arranged in a parallel-plate configuration, and yet are driven and respond as described above. FIG. 5 schematically illustrates a ring-shaped shuttle 102A of a MEMS gyroscope that may be operated in various modes, such as a distributed spring-mass structure with flexural or bulk acoustic wave (or "BAW") modes in which the suspended shuttle 102A changes shape as a result of drive forces applied by drive capacitors 106 and 109 (e.g., electrodes 105 and 108 form parallel-plate drive capacitors 106 and 109 directly with the mass 102A and may be driven in-phase with one another so that the mass 102A oscillates between circular and elliptical shapes along the X-axis direction, where the change of shape of the mass 102A is similar to the vibration of shuttle 102, and the resonance of mass 102A can be sensed via capacitor 151) or a rotationally-dithered mode (e.g., capacitors 106 and 109 may be configured and driven to produce forces that cause the shuttle 102A to rotate back-and-forth about the center anchor, with the rotational motion sensed via capacitor 151). The innovative principles disclosed herein can be applied to other types of resonators (e.g., solid disk, tuning fork, etc.) and other types of resonance modes (e.g., flexural, translational, rotation, bulk) with resonation in-plane and/or out-of-plane.

The circuits described above may be embodied in many different forms and may include a processor (e.g., a microprocessor, microcontroller, digital signal processor, or general purpose computer) with associated computer program logic, a programmable logic device (e.g., a Field Programmable Gate Array (FPGA) or other PLD) with associated programmable logic, discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently (non-transient) or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the gyroscope control, measurement, and output circuits described herein) are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

The embodiments of the invention described above are intended to be merely exemplary; numerous variations and modifications will be apparent to those skilled in the art based on the teachings contained herein. All such variations and modifications are intended to be within the scope of the present invention as defined in any appended claims.

What is claimed is:

1. A method of estimating a quality factor of a resonator, the method comprising:
    driving the resonator between alternating ramp-up and ring-down phases, the ramp-up phases driven using a first drive signal for a first duration, the ring-down phases driven using a second drive signal for a second duration, wherein the first drive signal has a first amplitude and wherein the second drive signal has a second amplitude less than the first amplitude;
    making first and second measurements of a parameter associated with a resonance of the resonator; and
    producing an estimation of the quality factor of the resonator based on the first and second measurements.

2. The method of claim 1, wherein both the first and second measurements are made during the same ramp-up or ring-down phases.

3. The method of claim 1, wherein the first and second measurements are made during different ramp-up or ring-down phases.

4. The method of claim 1, wherein the parameter includes at least one of (a) current flow or (b) charge on at least one sense electrode that is electrostatically coupled with the resonator for monitoring the resonance of the resonator.

5. The method of claim 1, wherein the resonator is part of a sensor having a sensor bandwidth, and wherein driving the resonator between alternating ramp-up and ring-down phases comprises:

alternatingly switching between the first drive signal and the second drive signal at a frequency above the sensor bandwidth.

6. The method of claim 1, further comprising:

adjusting at least one of the first drive signal, the first duration, the second drive signal, or the second duration based on the estimation of the quality factor of the resonator.

7. Apparatus for estimating a quality factor of a resonator, the apparatus comprising:

a driver circuit configured to drive the resonator between alternating ramp-up and ring-down phases, the ramp-up phases driven using the first drive signal for a first duration, the ring-down phases driven using a second drive signal for a second duration, wherein the first drive signal has a first amplitude and wherein the second drive signal has a second amplitude less than the first amplitude; and a quality factor measurement circuit configured to make first and second measurements of a parameter associated with a resonance of the resonator, the quality factor measurement circuit further configured to produce an estimation of the quality factor of the resonator based on the first and second measurements.

8. The apparatus of claim 7, wherein both the first and second measurements are made during the same ramp-up or ring-down phases.

9. The apparatus of claim 7, wherein the first and second measurements are made during different ramp-up or ring-down phases.

10. The apparatus of claim 7, wherein the parameter includes at least one of (a) current flow or (b) charge on at least one sense electrode that is electrostatically coupled with the resonator for monitoring the resonance of the resonator.

11. The apparatus of claim 7, wherein the resonator is part of a sensor having a sensor bandwidth, and wherein driving the resonator between alternating ramp-up and ring-down phases comprises:

alternatingly switching between the first signal and the second drive signal at a frequency above the sensor bandwidth.

12. The apparatus of claim 7, wherein the driver circuit is further configured to adjust at least one of the first drive signal, the first duration, the second drive signal, or the second duration based on the estimation of the quality factor of the resonator produced by the quality factor measurement circuit.

13. The apparatus of claim 7, wherein the sensor output circuit includes a low-pass filter or a band-pass filter.

14. A MEMS gyroscope comprising:

a resonator;

a driver circuit configured to drive the resonator between alternating ramp-up and ring-down phases, the ramp-up phases driven using a first drive signal for a first duration, the ring-down phases driven using a second drive signal for a second duration, wherein the first drive signal has a first amplitude and wherein the second drive signal has a second amplitude less than the first amplitude;

a quality factor measurement circuit configured to make first and second measurements of a parameter associated with a resonance of the resonator, the quality factor measurement circuit further configured to produce an estimation of a quality factor of the resonator based on the first and second measurements; and a gyroscope output circuit configured to sense rotation of the MEMS gyroscope based on Coriolis-induced signals.

15. The MEMS gyroscope of claim 14, wherein both the first and second measurements are made during the same ramp-up or ring-down phases.

16. The MEMS gyroscope of claim 14, wherein the first and second measurements are made during different ramp-up or ring-down phases.

17. The MEMS gyroscope of claim 14, wherein the parameter includes at least one of (a) current flow or (b) charge on at least one sense electrode that is electrostatically coupled with the resonator for monitoring the resonance of the resonator.

18. The MEMS gyroscope of claim 14, wherein the MEMS gyroscope has a sensor bandwidth, and wherein the driver circuit is configured to alternatingly switch between the first drive signal and the second drive signal at a frequency above the sensor bandwidth.

19. The MEMS gyroscope of claim 14, wherein the driver circuit is further configured to adjust at least one of the first drive signal, the first duration, the second drive signal, or the second duration based on the estimation of the quality factor of the resonator produced by the quality factor measurement circuit.

20. The MEMS gyroscope of claim 14, wherein the gyroscope output circuit includes a low-pass filter or a band-pass filter.

* * * * *